T. J. CAHILL.
NON-SLIPPING COVER FOR PULLEYS.
APPLICATION FILED MAR. 22, 1916.
1,217,270.
Patented Feb. 27, 1917.
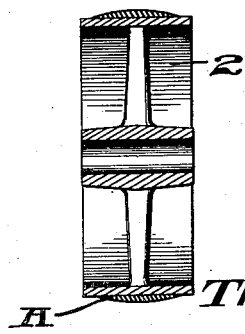
WITNESSES:
INVENTOR
Thomas J. Cahill.
BY
ATTORNEYS

UNITED STATES PATENT OFFICE.

THOMAS J. CAHILL, OF SAN FRANCISCO, CALIFORNIA.

NON-SLIPPING COVER FOR PULLEYS.

1,217,270. Specification of Letters Patent. Patented Feb. 27, 1917.

Application filed March 22, 1916. Serial No. 85,866.

*To all whom it may concern:*

Be it known that I, THOMAS J. CAHILL, a citizen of Australia, residing in the city and county of San Francisco and State of California, have invented new and useful Improvements in Non-Slipping Covers for Pulleys, of which the following is a specification.

This invention is designed to provide a means by which the slipping of belts upon pulleys may be prevented and the full force of the driving power may be exerted without danger of displacing the belt.

It consists of an endless rubber cover which is sufficiently less in diameter than the exterior of the pulley, so that when stretched upon the pulley it will adhere thereto and present an outer surface of such adherent character that the belt may exercise its full tractive effort without slipping or running off of the pulley.

It also comprises details of construction which will be more fully explained by reference to the accompanying drawings, in which the figure is a vertical section of a pulley with the cover extending partly across the rim.

In the running of machinery by the aid of belts and pulleys, it is difficult to retain the belt especially when it is slack, upon the pulley, and further when the latter is small or when it is wet. My invention is designed to overcome this difficulty.

As shown in the drawings, A represents an endless band, sufficiently smaller in diameter than the exterior diameter of the pulley 2, to which it is to be applied, so that it will have to be stretched and extended a little before it can be placed upon the pulley. This band is preferably made of rubber or other adherent material. The inner surface may be smooth to fit the surface of the pulley 2, to which it will adhere.

In some cases it will be found satisfactory to place such a band in the center of the pulley surface, and particularly if the pulley have a flat face; and in order to provide a sufficient amount of curvature to enable a belt to keep its position in the center of the pulley, the thickest part of the applied band may be in the center and the thickness of the band may be gradually diminished toward the edges of the pulley, so that the general convex surface will be formed over which the belt may travel.

The band, being of elastic material, will spread or yield laterally over the pulley face when subjected to external pressure, as by a belt. Since the pulley face is wider than the band the latter will not be cut by the edges of the pulley over which it would spread were the band and pulley of the same width.

Having thus described my invention, what I claim and desire to secure by Letters Patent is—

In combination with a pulley having a cylindrical periphery, an endless elastic band stretched over the pulley periphery, said band being thickest in its center and gradually tapering toward its side edges, and said pulley being wider than and extending beyond the edges of the band whereby to afford a base over which said band may laterally yield when subjected to external pressure.

In testimony whereof I have hereunto set my hand in the presence of two subscribing witnesses.

THOMAS J. CAHILL.

Witnesses:
JOHN H. HERRING,
W. W. HEALEY.